(12) United States Patent
Kodama et al.

(10) Patent No.: US 7,103,987 B2
(45) Date of Patent: Sep. 12, 2006

(54) LENGTH MEASURING APPARATUS

(75) Inventors: Kazuhiko Kodama, Utsunomiya (JP); Yutaka Ishikawa, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 33 days.

(21) Appl. No.: 10/830,829

(22) Filed: Apr. 23, 2004

(65) Prior Publication Data

US 2004/0211079 A1  Oct. 28, 2004

(30) Foreign Application Priority Data

Apr. 23, 2003 (JP) ............................. 2003-118087

(51) Int. Cl.
*G01B 5/04* (2006.01)
(52) U.S. Cl. .......................................... 33/706; 33/783
(58) Field of Classification Search ................. 33/706, 33/707, 708, 783
See application file for complete search history.

(56) References Cited

U.S. PATENT DOCUMENTS

| | | | | |
|---|---|---|---|---|
| 3,738,009 A | * | 6/1973 | Kuwada | 33/27.03 |
| 3,745,657 A | * | 7/1973 | Gonzalez | 33/449 |
| 4,136,958 A | * | 1/1979 | Nelle | 33/707 |
| 4,512,082 A | * | 4/1985 | Burkhardt | 33/706 |
| 4,563,555 A | * | 1/1986 | Ohtani | 200/52 R |
| 4,792,679 A | * | 12/1988 | Bissegger | 250/237 G |
| 4,976,043 A | * | 12/1990 | Bieg | 33/551 |
| 5,419,222 A | * | 5/1995 | Bieg | 82/1.11 |
| 5,450,009 A | * | 9/1995 | Murakami | 324/207.21 |
| 5,635,833 A | * | 6/1997 | Onodera et al. | 324/207.22 |
| 5,955,882 A | * | 9/1999 | Eisschiel et al. | 324/207.21 |
| 6,501,264 B1 | * | 12/2002 | Shiraishi et al. | 33/708 |
| 6,839,980 B1 | * | 1/2005 | Henshaw et al. | 33/706 |

FOREIGN PATENT DOCUMENTS

| | | |
|---|---|---|
| JP | 09-189574 | 7/1997 |
| JP | 2001-255134 | 9/2001 |

\* cited by examiner

*Primary Examiner*—Diego Gutierrez
*Assistant Examiner*—Travis Reis
(74) *Attorney, Agent, or Firm*—Rankin, Hill, Porter & Clark LLP

(57) ABSTRACT

A slider or a slide shoe for maintaining an interval between a scale and the slider is provided with inclined faces for excluding a foreign matter on a scale face or a sliding guide face at both ends of the slider in a moving direction thereof or at both ends of the slide shoe.

5 Claims, 5 Drawing Sheets

LENGTH MEASURING APPARATUS

BACKGROUND OF THE INVENTION

1. Field of the Invention

The present invention relates to a length measuring apparatus having a scale extended in a length measuring direction and a slider including a sensor moving in the length measuring direction along the scale relative thereto in a state of maintaining a predetermined interval between the scale and the slider. Particularly, the present invention relates to a length measuring apparatus preferably used in a linear scale or a length measuring unit and promoting reliability by avoiding an obstacle in mechanism against invasion of a foreign matter from outside.

2. Description of the Related Art

In a measuring apparatus of a linear scale or the like, there are guide mechanisms for ensuring a clearance between a scale and a detecting sensor by rolling (bearing) and sliding.

An example of a linear scale adopting the latter is shown by FIG. 6 (sectional view), FIG. 7 (right side view of a slider portion) and FIG. 8 (left side view of the same). The linear scale is provided with a scale 12, a slider 20, and a slider shoe 22. The scale 12 is extended in a length measuring direction (a direction orthogonal to paper face of FIG. 6). The slider 20 is moved in the length measuring direction along the scale 12 relative thereto in a state of maintaining a predetermined interval to the scale 12. The slider 20 includes a light source, an index scale and a sensor of a light receiving element (case of photosensitive type), an electrode element (case of electrostatic capacitor type), a receiving coil (case of electromagnetic induction type) or the like. The slide shoe 22 is fixed to the slider 20 for maintaining the interval between the scale 12 and the slider 20.

The scale 12 is fixed to a scale frame 10 fixed to one member of relative movement. A detecting unit 24 is fixed to other member of relative movement and a connecting rod 26 transmits relative movement displacement of the detector unit 24 to the slider 20. The slide shoe 22 slides on guide faces 11 provided, for example, on upper and lower sides of the scale 12 of the scale frame 10.

When the sliding mechanism is adopted, as shown by FIG. 9, when a foreign matter 30 is accumulated on front and rear sides of the slider shoe 22 and the foreign matter 30 is brought into an interval between the slide shoe 22 and the sliding guide face 11, there poses a problem that the clearance cannot be maintained and erroneous operation is produced.

In order to resolve such a problem, JP-A-9-189574 proposes to arrange an absorbing member capable of absorbing a liquid as a cleaning member on front and rear sides of a slider moving along a scale. Further, JP-A-2001-255134 discloses to provide wipers on front and rear sides of a slider to sweep to clean a surface of a scale.

Further, it has been conceived to alleviate an influence of a foreign matter to a sensor portion by changing a type of detection of a length measuring apparatus from a photoelectric type to an electromagnetic induction type.

However, according to the example of the related art shown in FIG. 6 through FIG. 8, the slide shoe 22 is constituted by a rectangular parallelepiped and therefore, as shown by FIG. 9, there poses a problem that in accordance with movement of the slider 20, the foreign matter 30 is accumulated on the front and rear sides and the foreign matter 30 cannot be excluded.

Further, according to methods disclosed in JP-A-9-189574 and JP-A-2001-255134, the absorbing element or the wiper is brought into contact with a face of the scale and therefore, there is a concern of bringing about a measuring error by producing a scratch.

Further, even when a sensor portion per se is provided with a resistance against a foreign matter as in the electromagnetic induction type, an obstacle of mechanism of wear, destruction of pattern or the like produced by bringing the foreign matter into the interval between the scale and the sensor moved relative to each other cannot be avoided.

SUMMARY OF THE INVENTION

The present invention has been carried out in order to resolve the above-described problem of the related arts and it is an object thereof to provide a length measuring apparatus promoting reliability of the apparatus by avoiding an obstacle of mechanism against invasion of a foreign matter from outside.

The present invention resolves the above-described problem by a length measuring apparatus comprising a scale extended in a length measuring direction, a slider including a sensor and moved in the length measuring direction along the scale relative thereto in a state of maintaining a predetermined interval to the scale, and a slider shoe for maintaining the interval between the scale and the slider, wherein the slide shoe include inclined faces for excluding a foreign matter on a sliding guide face at both ends of the slide shoe in a relative movement direction.

Further, the problem is similarly resolved by a length measuring apparatus comprising a scale extended in a length measuring direction, and a slider including a sensor and moved in the length measuring direction along the scale relative thereto in a state of maintaining a predetermined interval to the scale, wherein the slider include inclined faces for excluding a foreign matter on a scale face at both ends of the slider in a relative movement direction.

Further, a function of excluding the foreign matter is promoted by providing the inclined faces in both of a plane direction of the scale and a side face direction thereof.

Further, the foreign matter is made to be difficult to invade by making a face of the inclined face on side of the scale more proximate to a scale face than an interval between a sensor face of the slider and the scale face.

DETAILED DESCRIPTION OF THE INVENTION

A detailed explanation will be given of embodiments of the present invention in reference to the drawings as follows.

Figure 1:
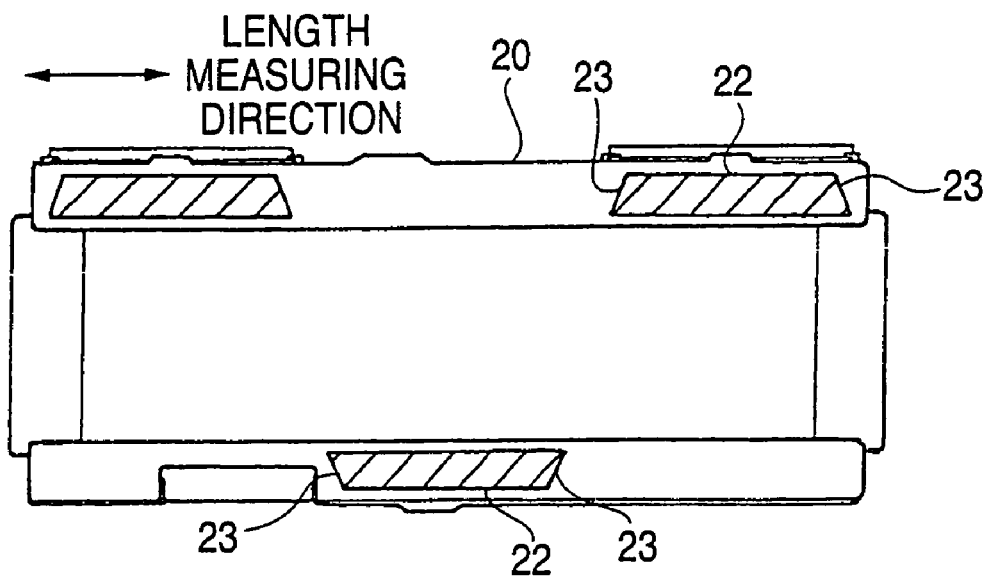
FIG. 1 is a left side view showing a shape of a slider according to a first embodiment of the present invention.
Figure 6:
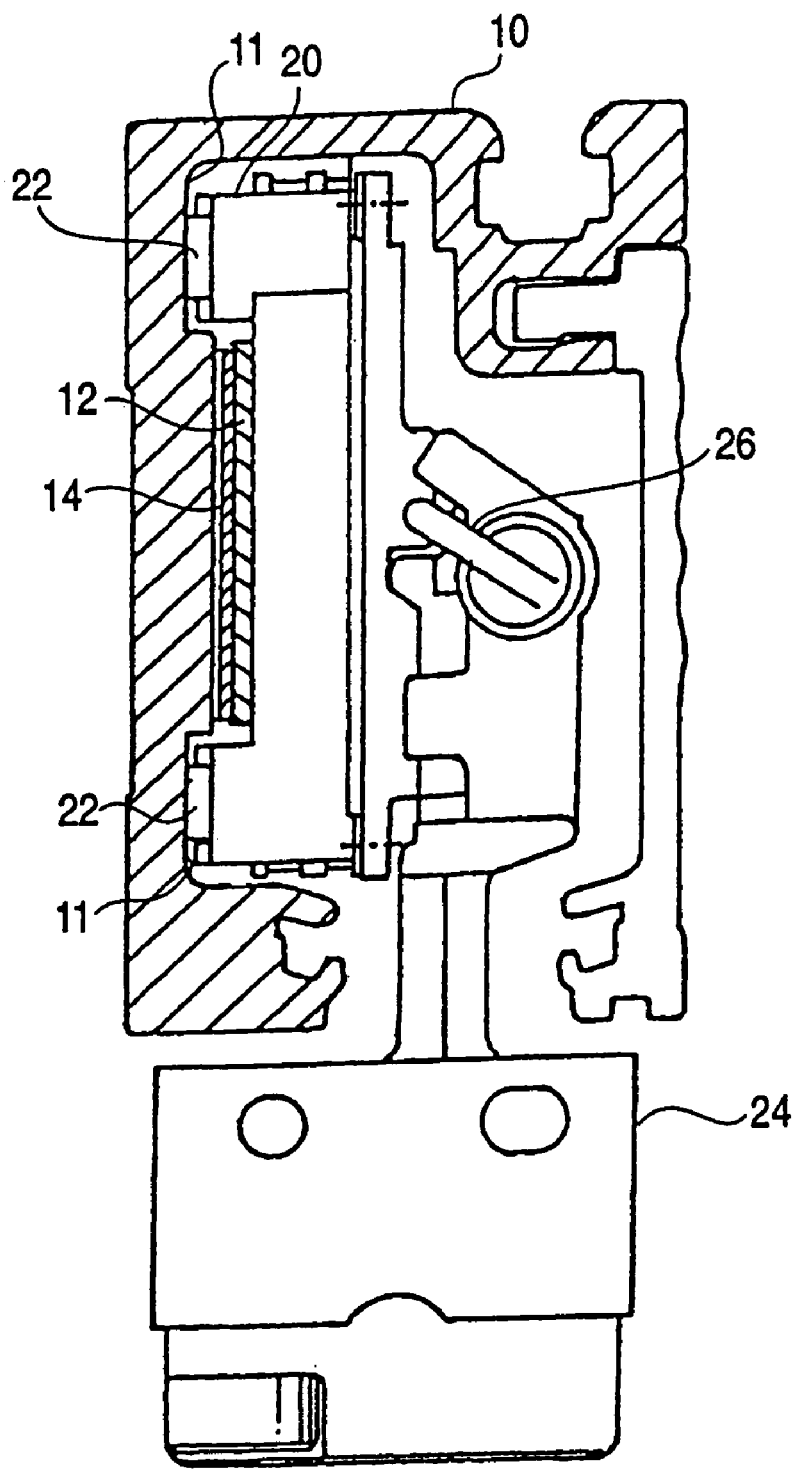
FIG. 6 is a sectional view showing a constitution of an example of a linear scale of a related art.
Figure 7:
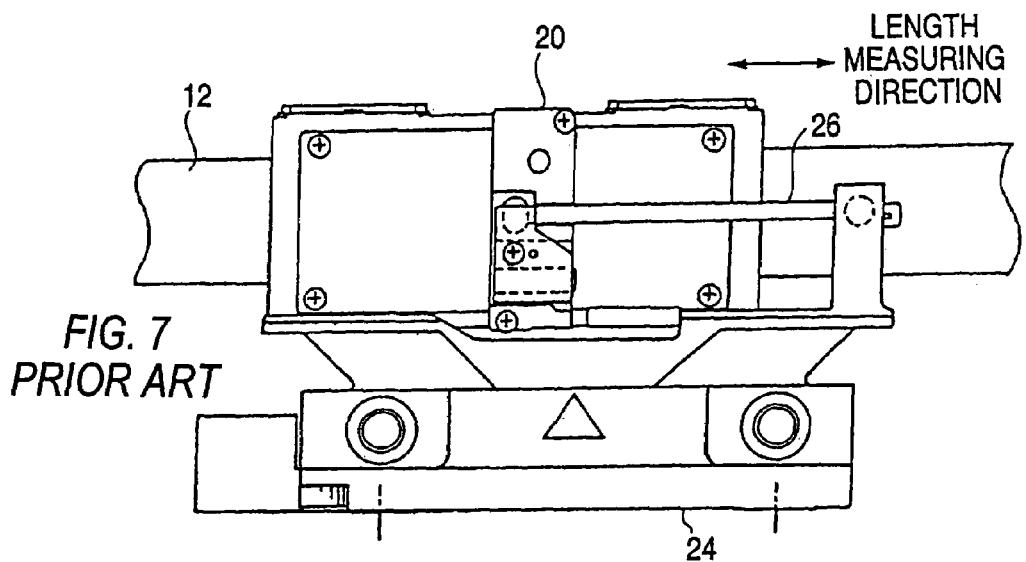
FIG. 7 is a right side view showing a shape of the slider of the same.
Figure 8:
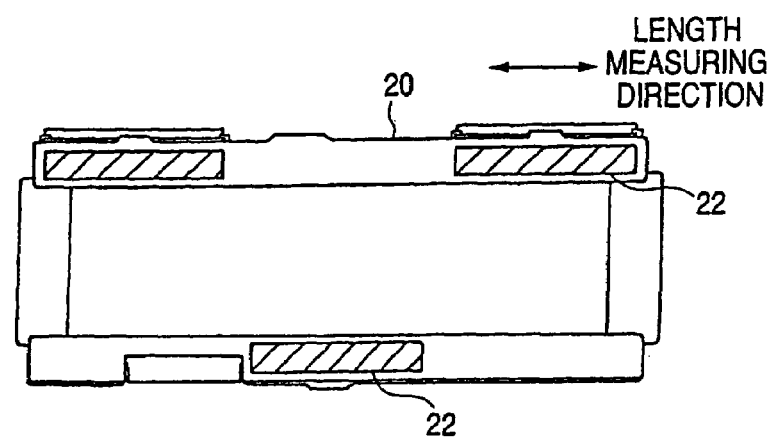
FIG. 8 is a left side view of the same.
Figure 9:
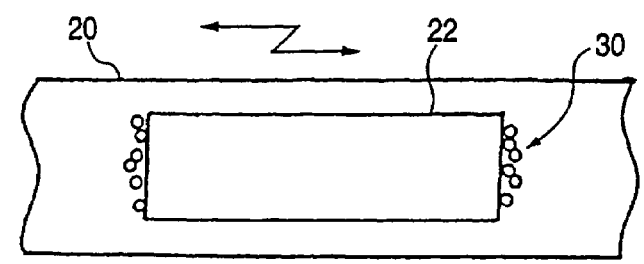
FIG. 9 is a view enlarging a slide shoe portion for explaining a problem of the example of the related art.

According to a first embodiment of the present invention, in a linear scale similar to that of the example of the related art shown in FIG. 6 through FIG. 8, as shown by a constitution of an essential portion in FIG. 1, a slide shoe 22 of a slider 20 is formed with inclined faces 23 inclined outwardly for excluding the foreign matter on a sliding guide face 11 at both ends of the slide shoe 22 in a direction of moving the slide shoe 22.

Figure 2:
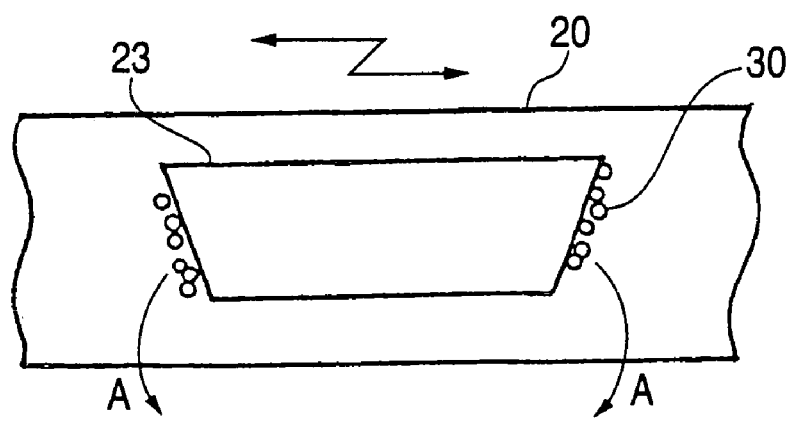
FIG. 2 is a view enlarging a slide shoe portion for explaining operation of the first embodiment.

According to the constitution, as shown by FIG. 2, by sliding the slide shoe 22, a foreign matter 30 accumulated on the sliding guide face 11 can be swept out to outside as shown by an arrow mark A.

Next, a detailed explanation will be given of a second embodiment of the present invention.

Figure 3:
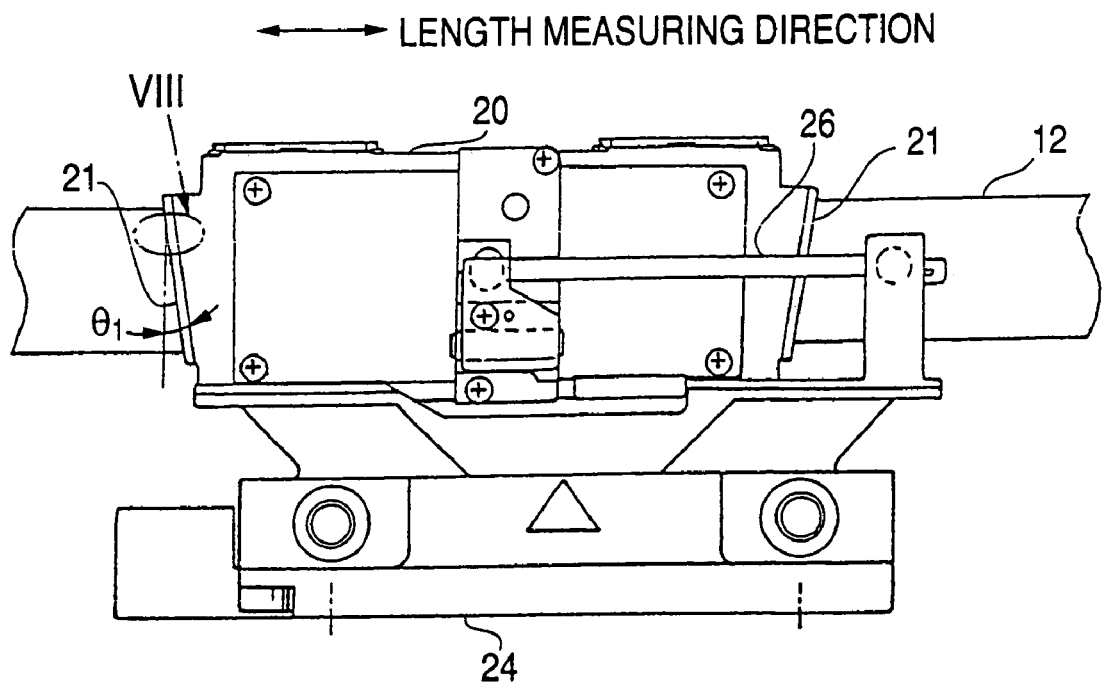
FIG. 3 is a right side view showing a shape of a slider according to a second embodiment of the present invention.

According to the embodiment, as shown by FIG. 3, a slider 20 is formed with inclined faces 21 having an angle of $\theta_1$ for excluding the foreign matter on a scale face 13 at both ends of the slider 20 in a moving direction.

Figure 4:
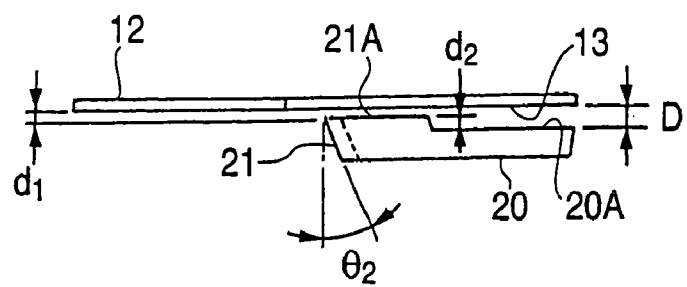
FIG. 4 is a sectional view of a VIII portion of FIG. 3.

As shown by FIG. 4, the inclined face 21 is provided not only in a plane direction of the scale but also a side face direction thereof by an angle $\theta_2$.

Figure 5:
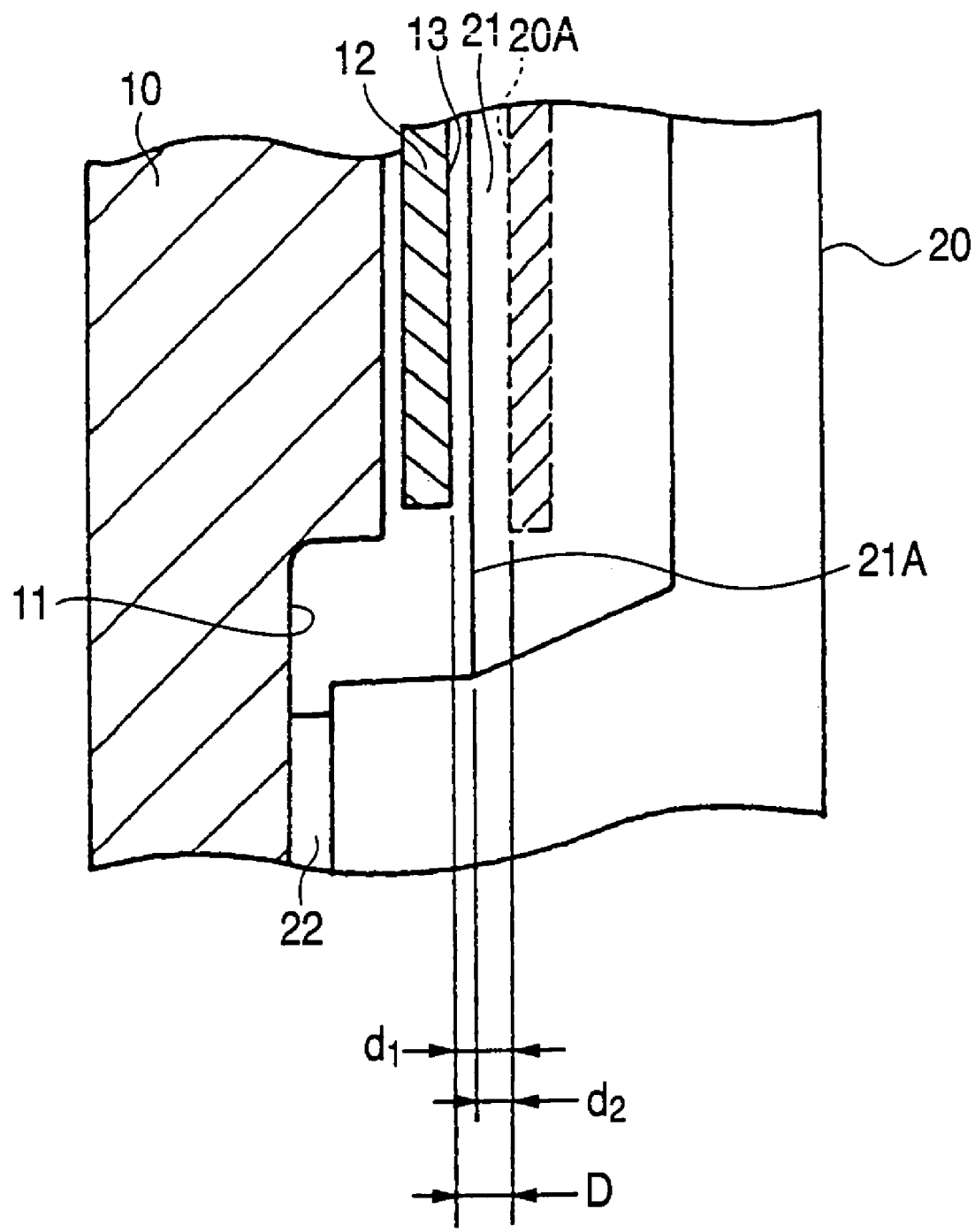
FIG. 5 is an enlarged sectional view showing a relationship between the slider and the scale of the second embodiment.

Further, as shown in FIG. 5 in details, a face 21A on a side of the scale of the inclined face 21 is made to be more proximate to the scale face 13 than an interval D between a sensor face 20A of the slider 20 and the scale face 13 by an amount of d2.

In this way, in a state of adhering the foreign matter onto the scale face 13, by sliding the slider 20 at the portion, the foreign matter can be removed.

According to the embodiment, the inclined face 21 is made to be more proximate to the scale face 13 than the interval D between the slider sensor face 20A and the scale face 13 by the amount of d2 and therefore, between the slider sensor face 20A and the scale 12, a foreign matter having a diameter exceeding d1 (=D−d2) is not brought into an inner side of the inclined face 21. Further, even when the inclined face 21 is not made to be proximate to the scale face 13 in this way, the invaded foreign matter can be excluded.

Although in the above-described embodiments, the inclined face 23 of the slide shoe 22 and the inclined face 21 of the slider 20 are provided in the different embodiments. The effect can further be promoted by using the both.

Further, a front end portion of the slider structure is not limited to an integrated structure but can also be constituted by two members by a flexible structural member of rubber or the like.

Further, although according to the embodiment, the present invention is applied to the linear scale, an object to which the present invention is applied is not limited thereto but the present invention is applicable also to a rotary encoder regardless of a photoelectric type, an electrostatic capacitor type, or an electromagnetic induction type.

According to the present invention, a reliability of the apparatus can be promoted by avoiding an obstacle of mechanism against the foreign matter from outside.

What is claimed is:

1. A length measuring apparatus comprising:
    a scale extended in a length measuring direction;
    a slider including a sensor and moved in the length measuring direction along the scale relative thereto in a state of maintaining a predetermined interval to the scale; and
    a slide shoe affixed to said slider, said slide shoe moving over said scale and in direct sliding contact with a sliding guide face of said scale, said slide shoe being rigidly affixed to said slider and serving to support said slider and space said slider the predetermined interval from the scale,
    wherein ends of the slide shoe in a relative movement direction have inclined faces, said inclined faces serving to exclude foreign matter from being introduced between the slide shoe and the sliding guide face.

2. The length measuring apparatus according to claim 1, wherein the slide shoe has a surface that faces toward the sliding guide face of the scale, and wherein an entire surface area of the slide shoe surface is in direct sliding contact with the sliding guide face of the scale.

3. A length measuring apparatus comprising:
    a scale extended in a length measuring direction and having a scale face; and
    a slider including a sensor having a sensor face, said slider being moved in the length measuring direction along the scale in a state of maintaining a predetermined interval between the scale face and the sensor face,
    wherein ends of the slider in a relative movement direction have inclined faces, and wherein the slider ends are spaced a first distance from said scale face and said slider sensor face is spaced a second distance from said scale face, said first distance being greater than zero and less than said second distance, wherein said inclined faces helping to exclude foreign matter from being introduced between the sensor face and the scale face, and wherein any foreign matter that is introduced between the sensor face and the scale face will be smaller than said second distance.

4. The length measuring apparatus according to claim 3, wherein the inclined faces are provided both in a plane direction of the scale and a side face direction thereof.

5. The length measuring apparatus according to claim 3, said slide further comprising:
    a slide shoe for supporting said slider and maintaining the predetermined interval between the scale and the slider;
    wherein ends of the slide shoe in the relative movement direction have inclined faces, said slide shoe inclined faces serving to prevent foreign matter from being introduced between the slide shoe and a sliding guide face that the slide shoe slides over.

* * * * *